United States Patent
Bauer

(10) Patent No.: US 9,837,871 B2
(45) Date of Patent: Dec. 5, 2017

(54) SECURING DEVICE AND METHOD FOR FIXING AN ELECTRIC MACHINE TO A COMPONENT

(71) Applicant: Robert Bosch GmbH, Stuttgart (DE)

(72) Inventor: Bertram Bauer, Gaggenau (DE)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 14/442,137

(22) PCT Filed: Nov. 12, 2013

(86) PCT No.: PCT/EP2013/073624
§ 371 (c)(1),
(2) Date: May 12, 2015

(87) PCT Pub. No.: WO2014/076083
PCT Pub. Date: May 22, 2014

(65) Prior Publication Data
US 2016/0294247 A1    Oct. 6, 2016

(30) Foreign Application Priority Data
Nov. 13, 2012  (DE) .................. 10 2012 022 112

(51) Int. Cl.
*H02K 5/22* (2006.01)
*H02K 5/04* (2006.01)
(Continued)

(52) U.S. Cl.
CPC .............. *H02K 5/22* (2013.01); *H02K 5/04* (2013.01); *H02K 5/15* (2013.01); *H02K 7/116* (2013.01); *H02K 5/225* (2013.01)

(58) Field of Classification Search
CPC .............. H02K 5/15; H02K 5/04; H02K 5/22
See application file for complete search history.

(56) References Cited

U.S. PATENT DOCUMENTS

| 4,534,749 A | 8/1985 | Hans et al. |
| 6,277,012 B1 * | 8/2001 | Halliley ............ B24B 45/00 |
| | | 451/359 |

(Continued)

FOREIGN PATENT DOCUMENTS

| DE | 10026467 | 12/2001 |
| DE | 102005030218 | 1/2007 |

(Continued)

OTHER PUBLICATIONS

International Search Report for Application No. PCT/EP2013/073624 dated Feb. 25, 2015 (English Translation, 2 pages).

*Primary Examiner* — Ramon M Barrera
(74) *Attorney, Agent, or Firm* — Michael Best & Friedrich LLP

(57) ABSTRACT

The invention relates to a securing plate (10), a fixing device and to a method for fixing an electric machine (12), for example to a component (30) of a motor vehicle, comprising a central through-opening (14) for receiving a round bearing sleeve (16) of the electric machine (12), said through opening (14) having a polygonal shape (15), the lateral surfaces (18) resting on the bearing sleeve (16). The securing plate (10) has, in a radially outer region (20), securing holes (22) via which the electric machine (12) can be secured to the component (30).

19 Claims, 2 Drawing Sheets

(51) Int. Cl.
*H02K 5/15* (2006.01)
*H02K 7/116* (2006.01)

(56) References Cited

U.S. PATENT DOCUMENTS

| | | | |
|---|---|---|---|
| 2001/0051543 A1* | 12/2001 | Aoki | F16D 3/78 464/19 |
| 2003/0025411 A1 | 2/2003 | Gotou | |
| 2008/0179117 A1 | 7/2008 | Scheer | |
| 2011/0114672 A2* | 5/2011 | Boudy | A23G 3/0021 222/145.3 |
| 2011/0225767 A1* | 9/2011 | Taylor | B60B 33/0007 16/45 |

FOREIGN PATENT DOCUMENTS

| | | |
|---|---|---|
| DE | 102011075837 | 11/2012 |
| EP | 0550102 | 7/1993 |

* cited by examiner

SECURING DEVICE AND METHOD FOR FIXING AN ELECTRIC MACHINE TO A COMPONENT

BACKGROUND OF THE INVENTION

The invention relates to a fastening plate, a fastening device, and also a method for fixing an electric machine to a component.

DE 10 2005 030 218 A1 discloses a fastening device, wherein an adapter element is arranged about an output shaft of an electric motor in order to fasten said electric motor by way of example in an automobile bodywork. The adaptor element that is embodied in two pieces is joined in a radial manner to an axial extension of the electric motor. The axial extension is a component of a bearing shield and comprises in its radial outer periphery a form closure that prevents the adapter element from rotating with respect to the electric motor. In order to position the output shaft of the electric motor precisely with respect to the automobile bodywork, very high demands are placed on the production of the adapter element. However, it is not possible to guarantee that the precise positioning remains permanent particularly if the environmental temperatures change.

SUMMARY OF THE INVENTION

The fastening plate in accordance with the invention and the fastening device and also the method for fastening an electric machine have in contrast thereto the advantage that by virtue of embodying a fastening plate with a central receiving opening for the axial extension of the bearing shield of the electric motor it is also possible to compensate effectively for bearing tolerances even over a large temperature range. For this purpose, the receiving opening is formed in the shape of a polygon that is pressed with its lateral surfaces in a radial manner against the axial extension of the electric machine. It is possible using the fastening orifices that are formed on the fastening plate to permanently fasten the electric machine in a highly space saving manner directly on a motor vehicle component.

It is possible by virtue of the measures disclosed in the dependent claims to achieve advantageous further developments and improvements of the embodiments disclosed in the independent claims. It is particularly advantageous if the fastening plate is embodied as a metal plate that is to a great extent planar and in which the receiving open is punched out as a through-going orifice. This through-going orifice is advantageously not round but rather is embodied as a polygon, wherein in particular a triangular or rectangular or pentagon or hexagon shape is formed. As a consequence, the approximately circular axial extension of the electric motor does not lie over the entire periphery of the receiving opening.

The cornered through-going orifice comprises in an expedient manner planar lateral surfaces that lie against the axial extension of the electric machine only in a contact region that is linear-shaped in the axial direction. The axial extension is preferably embodied as a bearing sleeve in which a bearing body—by way of example a roller bearing—of the output shaft is received.

In a preferred embodiment, only precisely three lateral walls lie in a radial manner against the bearing sleeve since this avoids a mechanical over-dimensioning of the radial bearing arrangement. It is possible to arrange by way of example further lateral walls of the through-going orifice in a radial manner outwardly offset so that said lateral walls do not have any contact to the bearing sleeve.

In order to compensate for manufacturing tolerances between the through-going orifice and the bearing sleeve, so-called deformation cut-outs are formed at least in the region of the bearing regions in a radial manner externally of the through-going orifice and said deformation cut-outs render it possible for the contact regions to move to a certain extent in a radial manner. The deformation cut-outs extend in the tangential direction along the lateral walls so that the peripheral wall of the through-going orifice comprises radially movable connecting pieces that can deform in an elastic or plastic manner.

In order to embody the lateral walls in such a manner that they move radially, the connecting pieces comprise a radial width of 0.5 mm to 3.0 mm, wherein a width of approx. 1.0 mm has proven itself to be particularly favorable. The axial thickness of the fastening plate in the region of the connecting pieces is ideally likewise 0.5 to 3.0 mm, preferably approx. 1.0 mm. It is possible by virtue of the radially flexibly lateral walls of the receiving opening to achieve a press-fit with the bearing sleeve without having to influence the bearing body inside the bearing sleeve with external press-down forces. The radial movability of the connecting pieces can be achieved in particular in a simple manner by means of elongated slots in the fastening plate, the extension of said slots in the tangential direction being greater than their radial dimension, and said slots being aligned approximately along the straight lateral surfaces.

In order to fasten the electric machine in a simple manner, the fastening plate comprises on the outer periphery fastening orifices that preferably lie radially outside the dimensions of the electric machine, in particular radially outside its pole housing. As a consequence, connecting means, such as screws, rivets or bent brackets, can be mounted without said connecting means conflicting with the installation space of the electric machine.

In addition to the through-going orifice and the deformation cut-outs, further through-going passages are embodied in the fastening plate and by way of example the electrical supply lines of the electric machine are routed through said through-going passages. Said electrical supply lines are located preferably radially outside the deformation cut-outs and are pushed onto the bearing sleeve by way of the cable feeds during the axial assemble of the fastening plate. In order to precisely fasten the rotational position of the fastening plate with respect to the housing of the electric machine, the fastening plate comprises an anti-rotation feature that is embodied as a radial and/or axial extension and engages in a corresponding mating receiving device in the housing of the electric machine. Consequently, by way of example, the fastening orifices and the through-going passages for the electrical contacts are positioned in their rotational position precisely with respect to the housing of the electric machine.

The fastening plate is part of a fastening device wherein the fastening plate is fastened in a non-rotatable manner to the bearing sleeve of the electric machine. The bearing sleeve is embodied in one piece with a bearing lid that closes a cylindrical pole housing of the electric machine. The bearing sleeve receives inside a bearing body in which the output shaft of the electric machine is mounted, said output shaft being in particular identical to the rotor shaft of the electric machine. In the case of this fastening device, a roller bearing—by way of example a ball bearing—can be received inside the bearing sleeve in such a manner that the outer bearing ring of the roller bearing is not adversely affected as the fastening plate is pressed onto the bearing sleeve.

Manufacturing tolerances and also thermal expansions during operation are effectively compensated for by virtue of the fastening method in accordance with the invention by means of the peripheral wall of the through-going orifice deforming in the radial direction. As a result of the symmetrical arrangement of the orifice regions of the lateral walls, the output pinion always remains precisely centered with respect to the fastening orifices. This ensures that the electric machine is positioned in a simple and precise manner during all operating states of the electric machine in the motor vehicle.

It is possible using this fastening device to fasten by way of example an electric machine that is embodied as a geared drive unit for an adjusting device to the motor vehicle in a reliable manner. By way of example, it is possible using the fastening plate to fasten a seat-adjusting drive, a window-operating drive, a windscreen washer drive or a throttle flap adjuster in the engine compartment to the bodywork in a reliable manner.

BRIEF DESCRIPTION OF THE DRAWINGS

Exemplary embodiments of the fastening plate, the fastening device and the fastening method in accordance with the invention are illustrated in the drawings and further explained in the description hereinunder.

In the drawings.

DETAILED DESCRIPTION

Figure 1:
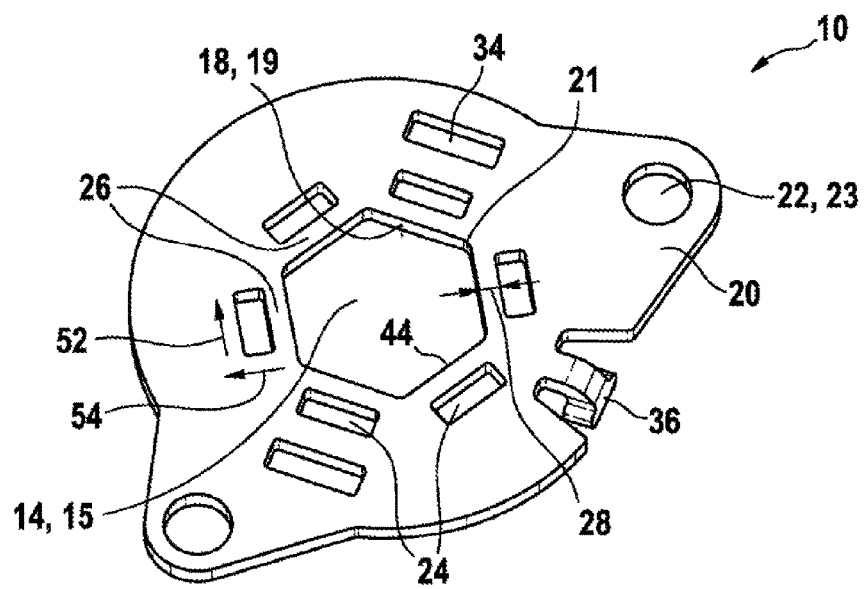
FIG. 1 illustrates a plan view of a fastening plate.

FIG. 1 illustrates a fastening plate 10 that is suitable for fastening an electric machine 12 to a component 30, by way of example to a motor vehicle bodywork. The fastening plate 10 comprises centrally a through-going orifice 14 into which it is possible to insert an axial extension of the electric machine 12. The through-going orifice 14 comprises planar lateral surfaces 18 that lie against the axial extension in a radial manner after assembly, said extension being embodied by way of example as a bearing sleeve 16. The individual lateral surfaces 18 are mutually connected by way of more or less emphasized corners 21. Consequently, the through-going orifice 14 is embodied approximately as a polygon or polygonal traverse that comprise by way of example rounded corners 21. In FIG. 1, the polygon is embodied by way of example as a hexagon with six planar surfaces 19. However, alternatively, the through-going orifice 14 can also be embodied as a triangle, rectangle, or pentagon. Deformation cut-outs 24 are embodied in a radial manner outside the lateral surfaces 18 and allow the lateral surfaces 18 to deform in a radial manner in order to compensate for tolerances when receiving the bearing sleeve 16. The deformation cut-outs 24 are longer in the tangential direction 52 than in the radial direction 54 so that the lateral surfaces 18 are embodied as radially deformable connecting pieces 26. The deformation cut-outs 24 that are embodied in this case as slots extend approximately parallel to the lateral surfaces 18. However, said deformation slots can also have a rounded or oval shape as illustrated by way of example in a variation in FIG. 2. The connecting pieces 26 preferably comprise a radial width 28 that is approximately equal to the axial thickness 32 of the fastening plate 10 in the region of the connecting pieces 26. In order to render the connecting pieces 26 radially deformable, the width 28 and the thickness 32 are approx. 1 mm; however, the width and thickness can also be in the range between 0.5 and 3.0 mm depending upon the requirement.

In the exemplary embodiment in FIG. 1, the through-going orifice 14 comprises approximately a regular hexagonal shape. However, it is possible in one variation to offset each second lateral surface 18 in a radially outwards manner so that only the three radially further inwards lying lateral surfaces 18 of the hexagon through-going orifice 14 lie against the bearing sleeve 16. It is possible by virtue of the round bearing sleeve 16 bearing in this manner against only three planar surfaces 19 to avoid a mechanical over-dimensioning of the bearing arrangement. A through-going orifice 14 of this type that is embodied as an irregular hexagon having lateral surfaces 18 that are of different lengths in the tangential direction 52 require by way of example less surface area than a corresponding triangular through-going orifice for a bearing sleeve 16 having the same diameter.

Figure 2:
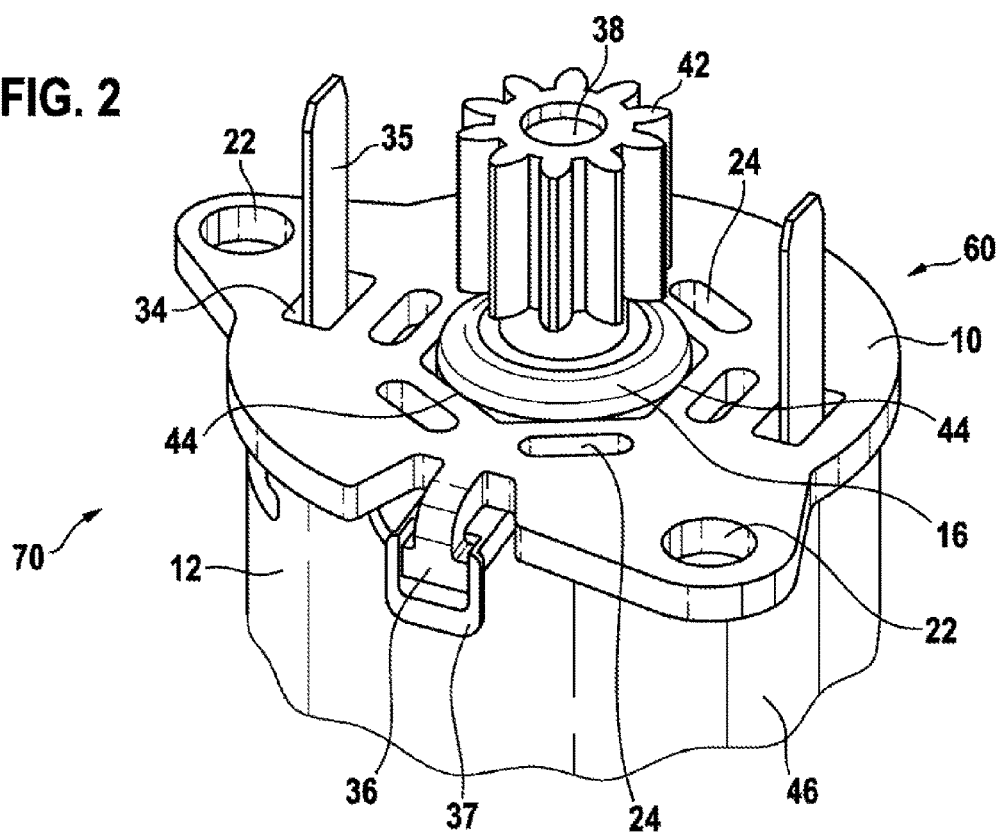
FIG. 2 illustrates a fastening plate that is mounted on an electric machine.

Furthermore, through-going passages 34 for connection elements are embodied in the fastening plate 10 and corresponding connections of the electric machine 12 are guided through said through-going passages in the assembled state. FIG. 2 illustrates by way of example electrical contacts 35 that can be embodied as punched-out parts or also as a cable. The electrical contacts 35 are by way of example embodied as supply lines or as electrical signal lines of the electric machine 12. Fastening orifices 22 for connection means to the component 30 are embodied in the radially outer region 20. The fastening orifices 22 are punched out in the exemplary embodiment as eyelets 23 directly from the fastening plate 10. The fastening orifices 22 lie radially outside the housing of the electric machine 12 in the assembled state so that it is possible to insert without any problem screws or rivets as connection means into the fastening orifices 22. Alternatively, the fastening orifices 22 can also be embodied as punched-out brackets that can be connected to the component 30 by means of material plastic deformation. In order to fix the fastening plate 10 precisely to the electric machine 12 with regard to the tangential direction 52, the fastening plate 10 comprises an anti-rotation device 36 that cooperates with a mating receiving device 37 of the electric machine 12. The anti-rotation device 36 is embodied as an axially bent bracket that engages into a corresponding receiving device in the housing of the electric machine 12. The anti-rotation device 36 can thus form a form closure with the housing of the electric machine 12 in the radial direction 54 or axial direction 50. In the exemplary embodiment, precisely two fastening orifices 22 are embodied on the axially outer periphery of the fastening plate 10. However, it is also possible in one variant to provide three or four fastening orifices 22. The fastening plate 10 is embodied as a metal sheet and the respective cut-outs are punched out from the metal sheet. All the cut-outs can be punched out advantageously in one working step and where applicable particular regions—such as by way of example the anti-rotation device 36 or the fastening orifices 22—can also be formed as one by means of a bending procedure. The through-going orifice 14 is embodied in the approximately circular fastening plate 10 in a radially central manner, radially offset thereto are the deformation cut-outs 24, radially offset thereto are the through-going passages 34 for the electrical contacts 35 and radially offset thereto are the fastening orifices 22.

In the fastening device 60 shown in FIG. 2, a fastening plate 10 in accordance with FIG. 1 is pressed onto the electric machine 12. The planar surfaces 19 of its through-going orifice 14 lie with contact regions 44 in a radial manner against the rounded bearing sleeve 16. The contact regions 44 are embodied in the axial direction 50 in an approximately linear manner so that in the plan view in accordance with FIG. 1 the planar surfaces 19 are only pressed at various spots in a radial manner against the rounded bearing sleeve 16. As the fastening plate 10 is pressed on, the deformable connecting pieces 26 are bent radially outwards until the fastening plate 10 lies against the electric machine 12 in an axial manner during the pressing-on procedure. A press-fit is formed between the through-going opening 14 and the bearing sleeve 16 and said press-fit fixes the fastening plate 10 in a reliable manner to the electric machine 12. The width 28 and the tangential length of the connecting pieces 26 are dimensioned in such a manner that the radial pressing-on forces do not deform the bearing sleeve 16. As a consequence, the function of the bearing body 40 that is mounted in the bearing sleeve 16 is not impaired. The rotor shaft 38 of the electric machine 12 is mounted in the bearing body 40 and an output element 42 that is embodied by way of example as a pinion is mounted on said rotor shaft. This output element 42 drives as a part that is to be adjusted by way of example a throttle flap or a seat component or a window lever or a windscreen wiper. A drive unit 70 of this type is connected to a component 30 of the motor vehicle by means of connection elements, not illustrated, that are arranged in the fastening orifices 22. By way of example, the drive unit 70 is reliably positioned in the engine compartment or on the frame of the motor vehicle by means of the fastening device 60 in accordance with the invention.

Figure 3:
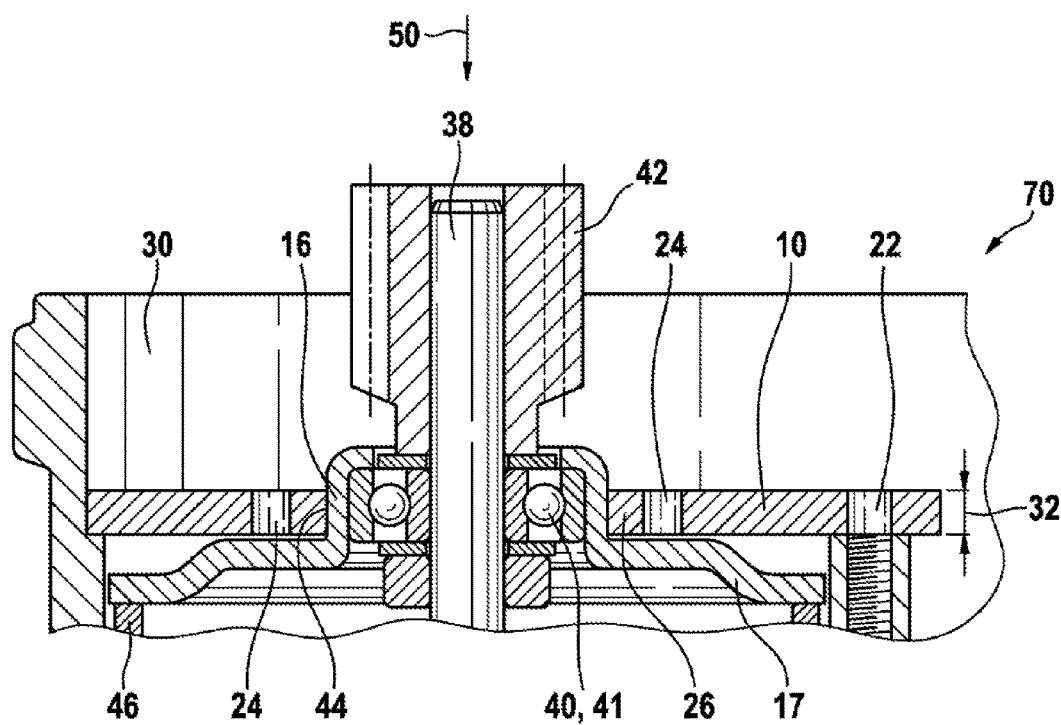
FIG. 3 illustrates a sectional view through the fastening device in accordance with FIG. 2.

FIG. 3 illustrates a sectional view of the drive device 70, wherein it is evident that the output element 42 is pushed onto the end of the output shaft 38. The bearing sleeve 16 is embodied as one piece with the bearing lid 17 that is preferably produced as a punched-out bent part. The bearing lid 17 is fastened by way of example on the outer periphery of a pole housing 46 of the electric machine 12. The bearing body 40 is arranged within the axial extension of the bearing sleeve 16 and said bearing body receives the output shaft 38 that is identical in this case to the rotor shaft of the electric machine 12. The bearing body 40 is embodied by way of example as a roller bearing, preferably as a ball bearing 41. The outer ring of the ball bearing 41 is subsequently pressed inside the axial extension that is embodied as the bearing sleeve 16, wherein the bearing inner ring is fastened to the output shaft 38. By way of example, the bearing body 40 is fixed in an axial manner in the bearing sleeve 16 by means of material plastic deformation of the bearing lid 17. The specific arrangement and design of the fastening orifices 22 on the fastening plate 10 can be modified in a simple manner depending upon the application without having to change the design of the through-going orifice 14 on the fastening plate 10. A precise coaxial positioning of the fastening plate 10 with respect to the output element 42 is always ensured by virtue of providing at least three contact regions 44 that are arranged uniformly distributed over the periphery. The electric machine 12 is embodied by way of example as an electric motor, wherein permanent magnets are arranged in the pole housing 46 that drive the rotor that is mounted on the output shaft 38.

It is to be noted that with respect to the exemplary embodiments illustrated in the figures and the description numerous possible combinations of the individual features are possible. Thus, by way of example specific shapes of the through-going orifice 14 and of the deformation cut-out 24, the through-going guide 34 and the fastening orifice 22 can be adapted to suit the respective application. In particular, the width 28 and the thickness 32 of the connecting pieces 26 are adapted to suit the required, or rather admissible, radial pressing-on forces with respect to the bearing sleeve 16. In the case of the embodiment of the through-going orifice 14, it is not the corners 21 that are decisive but rather the design of the planar lateral surfaces 19 between the corners 21 of a polygonal traverse.

What is claimed is:

1. A fastening device comprising an electric machine (12) and a fastening plate (10) for fixing the electric machine (12) to a component (30), said fastening plate having a central through-going orifice (14) configured to receive a round bearing sleeve (16) of the electric machine (12), wherein the bearing sleeve (16) receives a bearing body (40) of at least one of a rotor shaft and an output shaft (38), wherein the through-going orifice (14) comprises an approximately polygonal shape (15) having lateral surfaces (18) that come to lie against the bearing sleeve (16), wherein the fastening plate (10) comprises fastening orifices (22) in a radially outer region (20), the fastening orifices being configured to have the electric machine (12) fastened to the component (30) by means of said fastening orifices.

2. The fastening device as claimed in claim 1, characterized in that the polygonal shape (15) is embodied as a triangle or as a rectangle or as a pentagon or as a hexagon.

3. The fastening device as claimed in claim 1, characterized in that the lateral surfaces (18) are embodied as planar surfaces (19) that lie in a linear manner in an axial direction (50) against the bearing sleeve (16).

4. The fastening device as claimed in claim 1, characterized in that precisely three lateral surfaces (18) of the through-going orifice (14) lie with linear-shaped contact regions (44) against the bearing sleeve (16).

5. The fastening device as claimed in claim 1, characterized in that deformation cut-outs (24) are arranged radially spaced apart from the lateral surfaces (18) of the through-going orifice (14) and as a result of this arrangement the lateral surfaces (18) comprise regions that are embodied as radially deformable connecting pieces (26).

6. The fastening device as claimed in claim 5, characterized in that a radial width (28) of the connecting pieces (26) corresponds approximately to an axial thickness (32) of the fastening plate (10).

7. The fastening device as claimed in claim 5, characterized in that the deformation cut-outs (24) are longer in a tangential direction (52) than in a radial direction (54).

8. The fastening device as claimed in claim 1, characterized in that the fastening orifices (22) are embodied as eyelets (23) that lie radially outside an approximately circular basic shape of the fastening plate (10) and in an assembled state lie radially outside the electric machine (12).

9. The fastening device as claimed in claim 1, characterized in that through-going passages (34) are embodied for electrical contacts (35) of the electric machine (12) in the fastening plate (10).

10. A drive unit (70), comprising a fastening device (60) as claimed in claim 1, wherein the electric machine (12) includes an output element (42).

11. The fastening device as claimed in claim 1, characterized in that the polygonal shape (15) is embodied as a triangle or as a rectangle or as a pentagon or as a hexagon that is punched out from the fastening plate (10) that is embodied as a planar metal sheet.

12. The fastening device as claimed in claim 1, characterized in that the lateral surfaces (18) are embodied as planar surfaces (19) that lie in a linear manner in an axial direction (50) against the bearing sleeve (16) and form a press-fit with the bearing sleeve (16).

13. The fastening device as claimed in claim 1, characterized in that precisely three lateral surfaces (18) of the through-going orifice (14) lie with linear-shaped contact regions (44) against the bearing sleeve (16), wherein the contact regions (44) are arranged distributed uniformly over a periphery.

14. The fastening device as claimed in claim 5, characterized in that a radial width (28) of the connecting pieces (26) corresponds approximately to an axial thickness (32) of the fastening plate (10) and is in a region between 0.5 to 3.0 mm.

15. The fastening device as claimed in claim 5, characterized in that a radial width (28) of the connecting pieces (26) corresponds approximately to an axial thickness (32) of the fastening plate (10) and is approximately 1.0 mm.

16. The fastening device as claimed in claim 5, characterized in that the deformation cut-outs (24) extend approximately parallel to the lateral surfaces (18).

17. The fastening device as claimed in claim 1, characterized in that two through-going passages are embodied for electrical contacts (35) of the electric machine (12) in the fastening plate (10) and the fastening plate (10) comprises an anti-rotation device (36) that engages in a corresponding mating receiving device (37) of the electric machine (12) in order to fix the rotational position of the fastening plate (10) with respect to the electric machine (12).

18. The fastening device (60) as claimed in claim 1, wherein the bearing body (40) is a ball bearing, and the bearing sleeve (16) is embodied as one piece with a bearing lid (17) of the electric machine (12), as a punched-out and deep drawn metal part.

19. A method for fastening an electric machine (12) to a component (30), wherein a fastening plate (10) is pressed in an axial manner onto an axially protruding round bearing sleeve (16) of the electric machine (12), wherein the fastening plate (10) includes a central through-going orifice (14) configured to receive the round bearing sleeve (16), wherein the through-going orifice (14) comprises an approximately polygonal shape (15) having lateral surfaces (18) that come to lie against the bearing sleeve (16), and wherein the fastening plate (10) comprises fastening orifices (22) in a radially outer region (20), the fastening orifices (22) being configured to have the electric machine (12) fastened to the component (30) by means of said fastening orifices, wherein the lateral surfaces (18) of the through-going orifice (14) deform radially in at least one of an elastic manner and a plastic manner at contact spots (44) of said through-going orifice on the bearing sleeve (16), and subsequently the fastening orifices (22) of the fastening plate (10) are connected to the component (30), as a result of which an output element (42) of the electric machine (12) is positioned relative to the component (30).

* * * * *